United States Patent [19]

Balakrishnan

[11] Patent Number: 5,754,369
[45] Date of Patent: May 19, 1998

[54] HEAD SUSPENSION WITH SELF-SHIELDING INTEGRATED CONDUCTOR TRACE ARRAY

[75] Inventor: Arun Balakrishnan, Fremont, Calif.

[73] Assignee: Quantum Corporation, Milpitas, Calif.

[21] Appl. No.: 724,978

[22] Filed: Oct. 3, 1996

[51] Int. Cl.$^6$ .................. G11B 5/48; G11B 5/17
[52] U.S. Cl. .......................... 360/104; 360/123
[58] Field of Search ................................ 360/104

[56] References Cited

U.S. PATENT DOCUMENTS

| | | | |
|---|---|---|---|
| 4,761,699 | 8/1988 | Ainslie et al. | 360/103 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,491,597 | 2/1996 | Bennin et al. | 360/104 |
| 5,598,307 | 1/1997 | Bennin | 360/104 |
| 5,608,591 | 3/1997 | Klaassen | 360/104 |

OTHER PUBLICATIONS

Excerpt, Dorf, Ed., *The Electrical Engineering Handbook*, CRC Press, Boca Raton, FL., ©1993, pp. 884–885.

*Primary Examiner*—John H. Wolff
*Attorney, Agent, or Firm*—David B. Harrison; Debra A. Chun

[57] ABSTRACT

A head suspension has an integrated self-shielding trace conductor array for supporting and electrically interconnecting a dual element read/write head to electronic circuitry in a disk drive. Write traces are placed proximately to the read traces and are grounded during data reading operations in order to serve as a read trace electrostatic shield during the data reading operations.

13 Claims, 4 Drawing Sheets

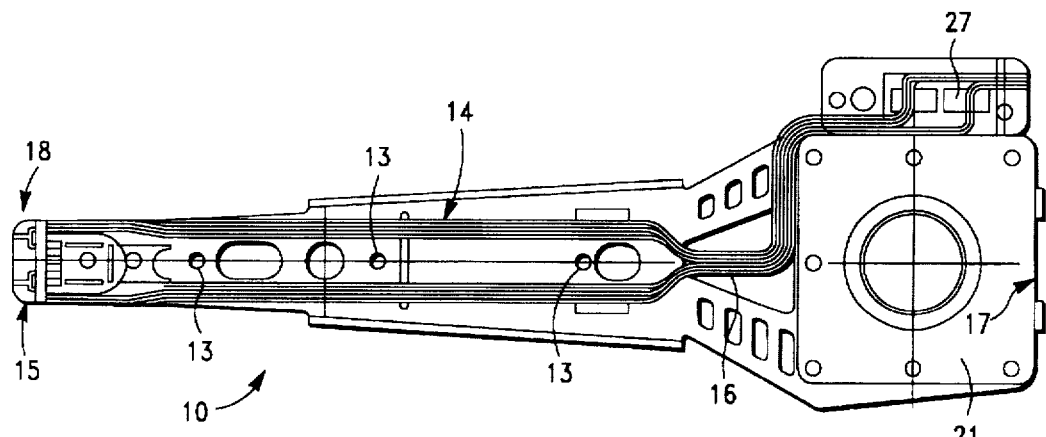
FIG.-2
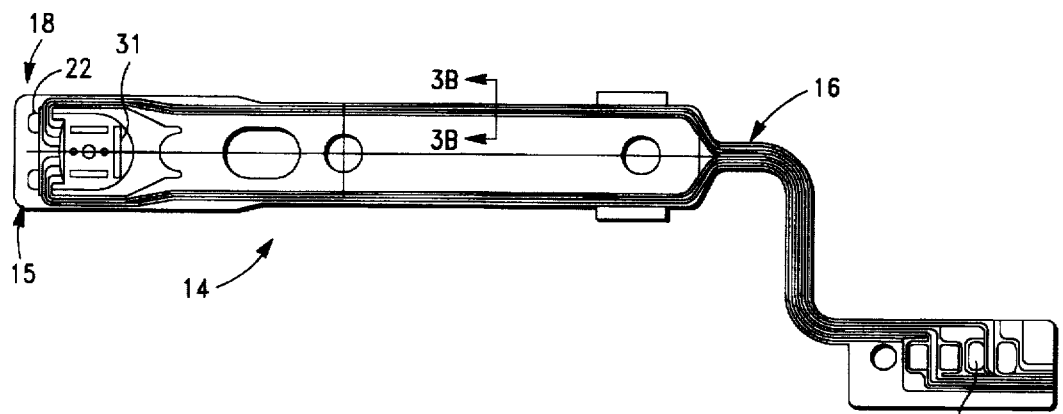
FIG.-3
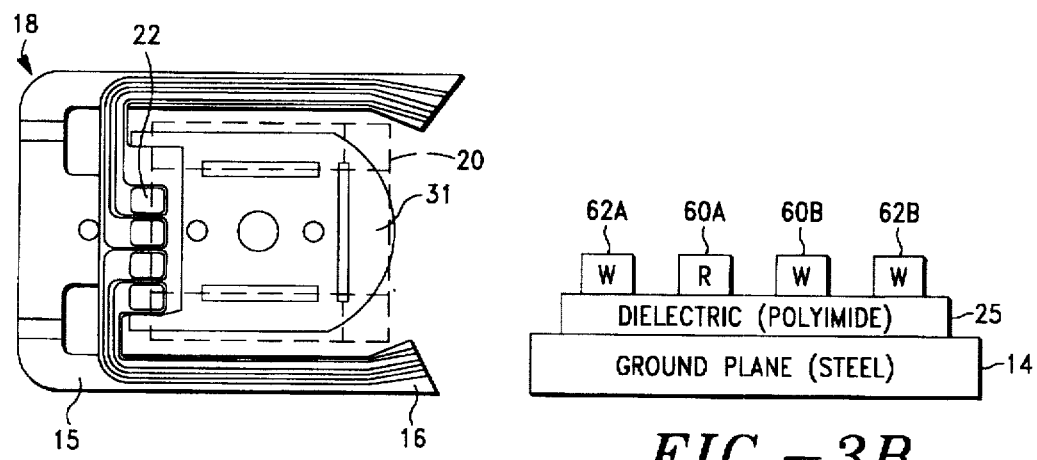
FIG.-3A
FIG.-3B

HEAD SUSPENSION WITH SELF-SHIELDING INTEGRATED CONDUCTOR TRACE ARRAY

REFERENCE TO RELATED APPLICATIONS

This is related to copending U.S. patent application Ser. No. 08/720,836, entitled: "Suspension with Integrated Conductors having Trimmed Impedance", and filed on Oct. 3, 1996, which is a continuation-in-part of U.S. patent application Ser. No. 08/621,431, filed on Mar. 25, 1996, the disclosure thereof being incorporated herein by reference. This is also related to copending U.S. patent application Ser. No. 08/720,833, entitled: "Suspension with Multi-Layered Integrated Conductor Trace Array for Optimized Electrical Parameters", and filed on Oct. 3, 1996, the disclosure thereof being incorporated herein by reference.

FIELD OF THE INVENTION

This invention relates generally to a structure and method for isolating select service loop pairs of a trace conductor array formed integrally with a flexure of a head suspension assembly from unwanted interference. More particularly, the present invention relates to an integrated suspension and conductor structure wherein the suspension traces are arranged and configured to provide self-shielding of at least one signal pair against unwanted electromagnetic noise (EMI) or radio frequency interference (RFI).

BACKGROUND OF THE INVENTION

Contemporary disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

The read/write transducer, which may be of a single or dual element design, is typically deposited upon a ceramic slider structure having an air bearing surface for supporting the transducer at a small distance away from the surface of the moving medium. Single write/read element designs typically require two wire connections while dual designs having separate reader and writer elements require four wire connections. Magnetoresistive (MR) heads in particular generally require four wires. The combination of an air bearing slider and a read/write transducer is also known as a read/write head or a recording head.

Magnetoresistive sensing elements may alternatively have so-called "giant magneto-resistive" (GMR) or "collossal magneto-resistive" (CMR) properties. As used herein, the term "magnetoresistive" or "MR" includes GMR and CMR sensors. Basically, a flux transition field proximate to the MR sensor causes a change in resistance in the sensor. The change in resistance in the presence of a constant current results in a change in voltage which is sensed by a read preamplifier circuit. The actual properties of the MR sensor will determine the magnitude of voltage amplitude change in response to the magnetic flux change.

Sliders are generally mounted to a gimbaled flexure structure attached to the distal end of a suspension's load beam structure. A spring biases the load beam and the head towards the disk, while the air pressure beneath the head pushes the head away from the disk. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components. Demand for increased areal densities may nonetheless require that heads be operated in pseudo contact or even boundary lubricated contact regimes, however.

Currently, flying heights are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 200 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Smaller slider structures generally require more compliant gimbals, hence the intrinsic stiffness of the conductor wires attached to the slider can give rise to a significant undesired bias effect.

Very small diameter twisted solid wires have typically been used to connect head elements formed on sliders to other signal carrying and processing structures within the disk drive. The two conductors of a twisted pair service loop are inherently shielded from external noise sources such as EMI and RFI by virtue of the fact that the conductors are twisted around each other. Coaxial transmission line cables are also inherently self-shielding, but the center conductor is electrically unbalanced with respect to the outer cylindrical shield conductor.

To reduce the effects of this intrinsic wire stiffness or bias, integrated flexure/conductor structures have been proposed which effectively integrate the wires with an insulating flexible polymeric resinous flexure such that the conductors are exposed at bonding pads positioned at the distal end of the flexure in the proximity of the head. U.S. Pat. No. 5,006,946 to Matsuzaki discloses an example of such a configuration. U.S. Pat. No. 5,491,597 to Bennin et al. discloses a further example in point. While such wiring configurations do enjoy certain performance and assembly advantages, the introduction of the disclosed flexible polymeric resinous material in the flexure and gimbal structure raises a number of challenging design issues. For example, the thermal expansion properties of the resinous material is not the same as the prior art stainless steel structures; and, the long-term durability of such resinous structures, including any requisite adhesive layers, is unknown. Therefore, hybrid stainless steel flexure and conductor structures have been proposed which incorporate most of the benefits of the integrated conductor flex-circuit flexure structures while remaining largely compatible with prior art fabrication and load beam attachment methods. Such hybrid designs typically employ stainless steel flexures having deposited insulating and conductive trace layers for electrical interconnection of the head to the associated drive electronics, e.g., a proximately located preamplifier chip and downstream read channel circuitry typically carried on a circuit board (along with other circuitry) attached to the head/disk assembly.

As taught by U.S. Pat. No. 5,491,597 to Bennin et al., entitled: "Gimbal Flexure and Electrical Interconnect Assembly", the disclosed prior approach called for use of a spring material for the conductive trace layers, such as beryllium-copper alloy, which admittedly has higher electrical resistance than pure annealed copper, for example. On the other hand, pure annealed copper, while a satisfactory electrical conductor at high frequencies, also manifests high ductility rather than spring-like mechanical resilience, and therefore lacks certain mechanical spring properties desired in the interconnect trace material. Traces formed of pure copper plated or deposited onto e.g. a nickel base layer provide one alternative to the beryllium-copper alloy relied upon by the Bennin et al. approach.

These hybrid flexure designs employ relatively lengthy parallel runs of conductor trace pairs or four-wire sets which extend from bonding pads at the distal, head-mounting end of the flexure to the proximal end of the flexure, to provide a conductive path from the read/write head along the length of the associated suspension structure to the preamplifier or read-channel chip(s). Because the conductive traces of a service loop are typically formed in a side-by-side arrangement on a dielectric layer of the trace array, the traces can act as pick-up antennas, and the self-shielding advantages obtained from twisted wire pair arrangements are not available. A service loop formed of two side-by-side or vertically aligned traces remains susceptible to noise from e.g. EMI or RFI sources within or external to the disk drive.

While the Bennin et al. '597 patent discussed above includes an embodiment of FIGS. 6-8 calling for stacking of traces to form a multi-level array of trace sets in order to handle a large number of signals, there is no teaching or suggestion within Bennin et al. '597 to arrange the conductor traces of multiple signal loops in a manner providing desired shielding from noise of selected trace pair signal loops.

The invention to be described provides, inter alia, a flexure for a suspension in a disk drive which includes a multiple layered integrated conductor array arranged to provide self shielding for selected service loop pairs from external noise sources.

SUMMARY OF THE INVENTION WITH OBJECTS

A general object of the present invention is to provide a low-profile, robust and reliable high performance suspension assembly having a self-shielding integral conductor trace array for electrically interconnecting a read/write head to associated read/write circuitry which overcomes limitations and drawbacks of the prior art.

A self-shielding integrated flexure/conductor structure supports a multi-element read/write head/slider assembly adjacent to a storage medium and electrically interconnects a read element of the head to read circuitry and a write element of the head to write circuitry. The flexure/conductor structure comprises a generally planar conductive flexure member having a gimbal for supporting the read/write head/slider structure in proximity to a relatively moving data storage disk; a first electrical insulation layer disposed on the flexure member; electrical traces forming a write signal path connecting the write element with the write circuitry disposed on the first electrical insulation layer, electrical traces forming a read signal path connecting the read element with the read circuitry, and trace shields included within the integrated flexure/conductor structure for electrostatically shielding the read path during data reading operations when data is read from the storage medium.

As one aspect of the invention, the electrical traces forming the read path are formed on the first electrical insulation layer in substantially parallel longitudinal alignment with the traces forming the write path, and the trace shields comprise electrical traces included in the write path. In this aspect the write circuitry effectively grounds the write path traces during data reading operations. In this aspect the electrical traces forming the read path are preferably arranged on the insulation layer inside of electrical traces forming the write path.

In another aspect of the invention a second insulation layer is formed over the first insulation layer, and second layer traces comprising the write path and the electrical traces forming the read path are formed on the second insulation layer and are surrounded by additional traces connected with and additionally comprising the write path. As a further related aspect a third insulation layer may be formed over the second electrical insulation layer and third layer traces comprising the write path are formed on the third insulation layer overlying the electrical traces comprising the read path.

As another aspect of the invention a disk drive for storing and reproducing information includes a disk drive base; a storage disk rotatably mounted to the base and rotated by a disk motor; a slider for flying in proximity to a data storage surface of the storage disk; a dual-element magnetoresistive read/inductive write head for reading information from and writing information to the storage surface; a movable actuator mounted to the base for selectively positioning the head relative to a radius of the storage surface; a read preamplifier/write driver circuit mounted on the actuator for communicating with head; and, an integrated-conductor suspension attached to the actuator for supporting the head adjacent to the storage disk and for electrically interconnecting the head to the signal processing means, the suspension comprising:

a generally planar conductive load beam structure having a proximal actuator mounting end and a gimbaled head mounting region at a distal end for attaching the head, an electrical insulation layer attached to the load beam structure along a trace interconnect region, and at least four electrically conductive traces disposed on the electrical insulation layer adjacent to the load beam such that two of the electrically conductive traces connect a write element of the dual-element head to the circuit and provide an electrostatic ground shield to two other traces connecting a read element of the dual-element head to the circuit during read operations of the disk drive.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 2 is an enlarged diagrammatic plan view of a preferred embodiment of integrated flexure/conductor load beam structure having tuned conductive traces in accordance with principles of the present invention.

FIG. 3 is an enlarged plan view of a flexure of the FIG. 2 load beam structure having integral wiring incorporating the tuned conductive trace array.

FIG. 3A is a greatly enlarged plan view of a read/write head connection region of the FIG. 3 flexure trace array and wherein the head slider is shown in dashed line outline.

FIG. 3B is a greatly enlarged view in elevation and cross-section taken along section line 3B—3B in FIG. 3 illustrating a trace array configuration providing self-shielding to an MR read sensor service loop trace pair by using the write service pair to enclose the read service loop pair in accordance with principles of the present invention.

DETAILED DESCRIPTION OF PREFERRED EMBODIMENTS

Figure 1:
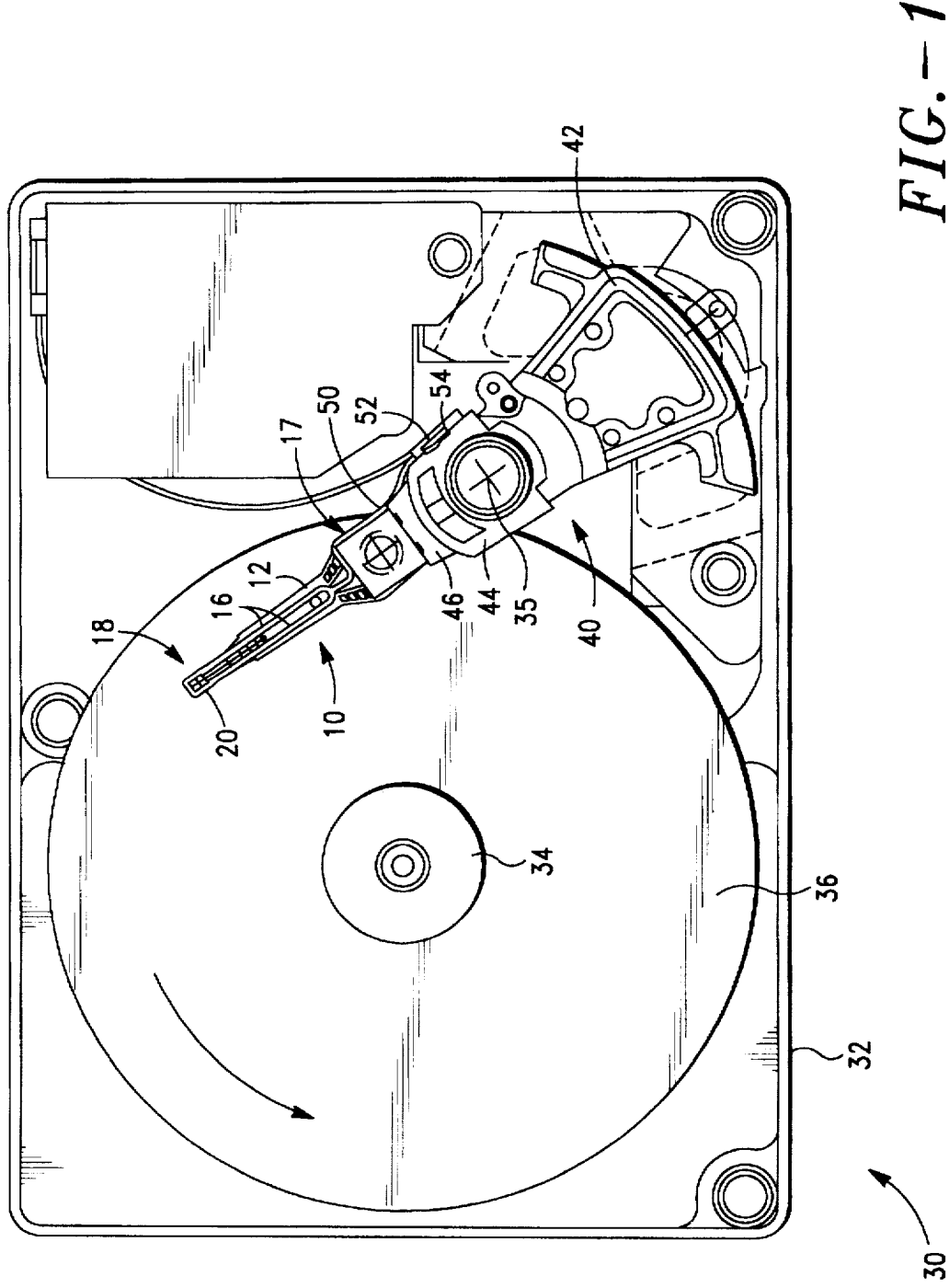
FIG. 1 is an enlarged, diagrammatic plan view of a disk drive including a suspension assembly having a multi-layer conductive trace array incorporating principles of the present invention.

Referring to the drawings, where like characters designate like or corresponding parts throughout the views, FIG. 1 presents a diagrammatic top plan view of a head/disk assembly (HDA) of a hard disk drive 30. The hard disk drive 30 employs at least one load beam assembly 10 having a flexure 14 including a self-shielding trace interconnect structure or array 16 embodying principles of the present invention. FIG. 1 shows the load beam assembly 10 with the flexure 14 and trace interconnect array 16 employed within its intended operating environment.

In the present example disk drive 30 includes e.g. a rigid base 32 supporting a spindle 34 (and spindle motor, not shown) for rotating at least one storage disk 36 in a direction shown by the curved arrow. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block 44 and head arms 46 (and load beam assemblies 10) at radial track positions defined on the facing surfaces of storage disks 36. At least one of the load beam assemblies 10 is secured at its proximal end 17 to a distal end of a head arm 46, e.g. by conventional ball-swaging techniques.

Conventionally, but not necessarily, two load beam assemblies 10 are attached to head arms 46 between disks 36; and, one load beam structure 10 is attached to head arms above and below the uppermost and lowermost disks of a disk stack comprised of multiple disks 36 spaced apart on spindle 34. The self-shielding trace interconnect structure 16 connects to a flexible trace/film segment 50 which extends to a ceramic hybrid circuit substrate 52 secured to a side of the E-block 44. The ceramic hybrid circuit 52 secures and connects a read preamplifier/write driver chip or circuit 54. Most preferably, the chip 54 is nested between the ceramic substrate of the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection.

As shown in FIGS. 2, 3, 3A and 3B, the load beam assembly 10 includes a generally planar formed stainless steel load beam 12 and a flexure 14. In the present example, the flexure 14 is formed of thin stainless steel sheet material which is e.g. approximately 20-microns thick. An array of two pairs of conductive traces 60 and 62 of approximately 10-microns thick copper conductor forms part of a trace interconnect structure 16 which extends from the proximal end 17 of flexure 14 to another connection pad array 22 located at the slider-supporting distal end 18 of the load beam assembly 10. A transducer head slider 20 is attached to the gimbal 15 by a suitable adhesive at the distal end 18 of the load beam structure 10. As shown in FIG. 3B the four connection pads 22 at the distal end 18 are provided for connection by e.g. ultrasonically-welded gold ball bonds to four aligned connection pads of a dual-element (four conductor) thin film magneto-resistive read/write head structure (not shown) formed on a trailing edge of the slider body 20. Preferably, although not necessarily, the slider body 20 is a 30% slider.

Trace interconnect structure 16 includes a high dielectric polyimide film base 25 interposed between two conductive trace pairs 60A–60B and 62A–62B of the conductor array 16 and the stainless steel flexure 14. Service pair 60A–60B connects to the MR read element 70, and service pair 62A–62B connects to the thin film inductive write element 72 of the read/write head structure. The dielectric layer 25 is preferably about 10-microns thick. In accordance with principles of the present invention, the trace pair 60A–60B forming the MR read element service loop is surrounded within a single trace plane by the traces 62A and 62B of the service loop for the write element. Since the write traces are not carrying write current while the MR read element is active, the write traces may be used to provide the requisite shielding. It is necessary in the FIG. 3B arrangement that the write traces 62A and 62B are held at a low impedance relative to the electrical ground plane of the flexure 14 during read mode operation of the drive 30 in order to provide effective electrostatic (Faraday) shielding of the read element service loop pair 60A–60B. Accordingly, the preamplifier driver chip 54 presents a low impedance path to electrical ground on the write traces 62A and 62B during read mode operations of the disk drive 30, so that the write traces are effectively grounded during data reading operations when the signal levels on the read path traces 60A–60B are low and susceptible to pickup of unwanted extraneous noise energy.

Figure 4:
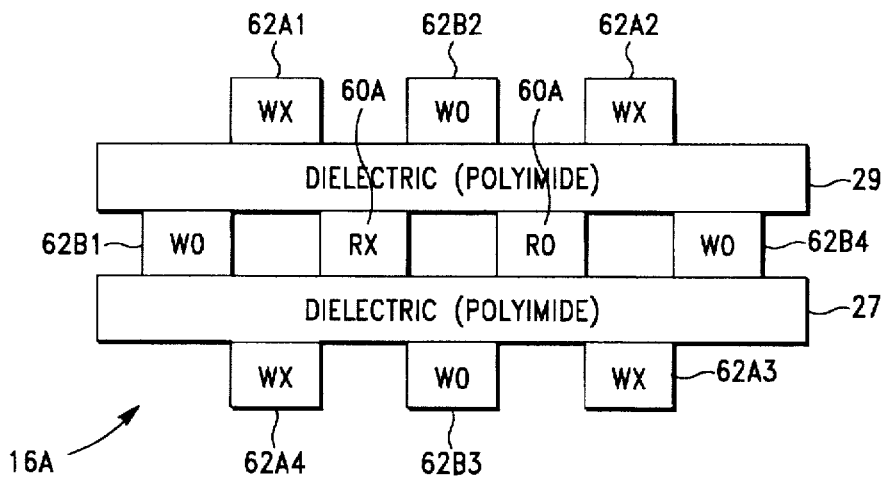
FIG. 4 is a greatly enlarged diagrammatic view in elevation and cross section of a further self-shielding embodiment of the invention similar to the FIG. 3B embodiment but in which write traces are located in layers above and below a central layer for the read trace service loop pair.
Figure 5:
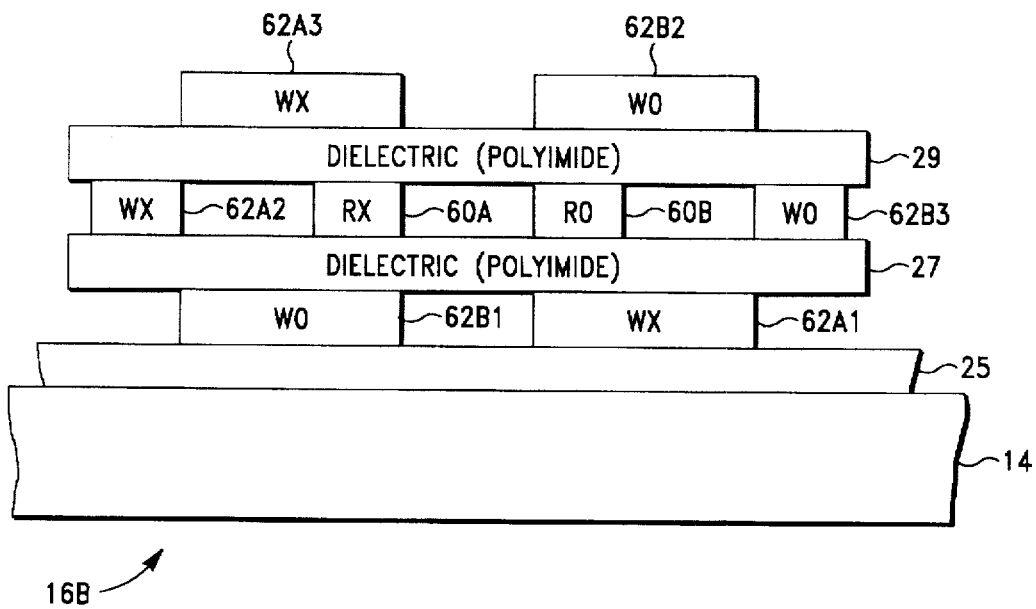
FIG. 5 is a greatly enlarged diagrammatic view in elevation and cross section of still one more self-shielding embodiment of the invention similar to the FIG. 4 embodiment wherein the write service loop traces are alternated adjacent to the flexure in order to obtain balanced capacitance to the ground plane provided by the flexure.

If trace conductors are formed in a multi-layer trace array, such as shown in FIGS. 4 and 5, electrostatic shielding becomes easier.

The FIG. 4 approach shows that the write service loop may be divided into multiple traces in multiple levels of a multi-level trace interconnect array 16A. The multiple write loop traces are arranged in the multi-level trace interconnect array 16A to surround and electrostatically shield the MR read element service loop pair 60A–60B. In the FIG. 4 approach, one write loop conductor 62A is divided into four parallel-connected traces 62A1, 62A2, 62A3 and 62A4. The other write service loop conductor 62B is also divided into four parallel-connected traces 62B1, 62B2, 62B3 and 62B4. The FIG. 4 arrangement is particularly useful if the ground plane presented by e.g. the flexure 14 is spaced a distance away, as by employing standoffs similar to those taught by the Bennin et al. '597 patent referred to above. If an electrical ground plane is proximately near, and if the supply and return paths of a service loop need to be equalized with respect to capacitance to the ground plane, then the multi-layer trace interconnect array 16B set forth in FIG. 5 provides a self-shielding arrangement for the read service pair 60A–60B while also providing balanced capacitance of the write pairs 62A and 62B to the ground plane presented by the metal flexure 14.

Figure 6:
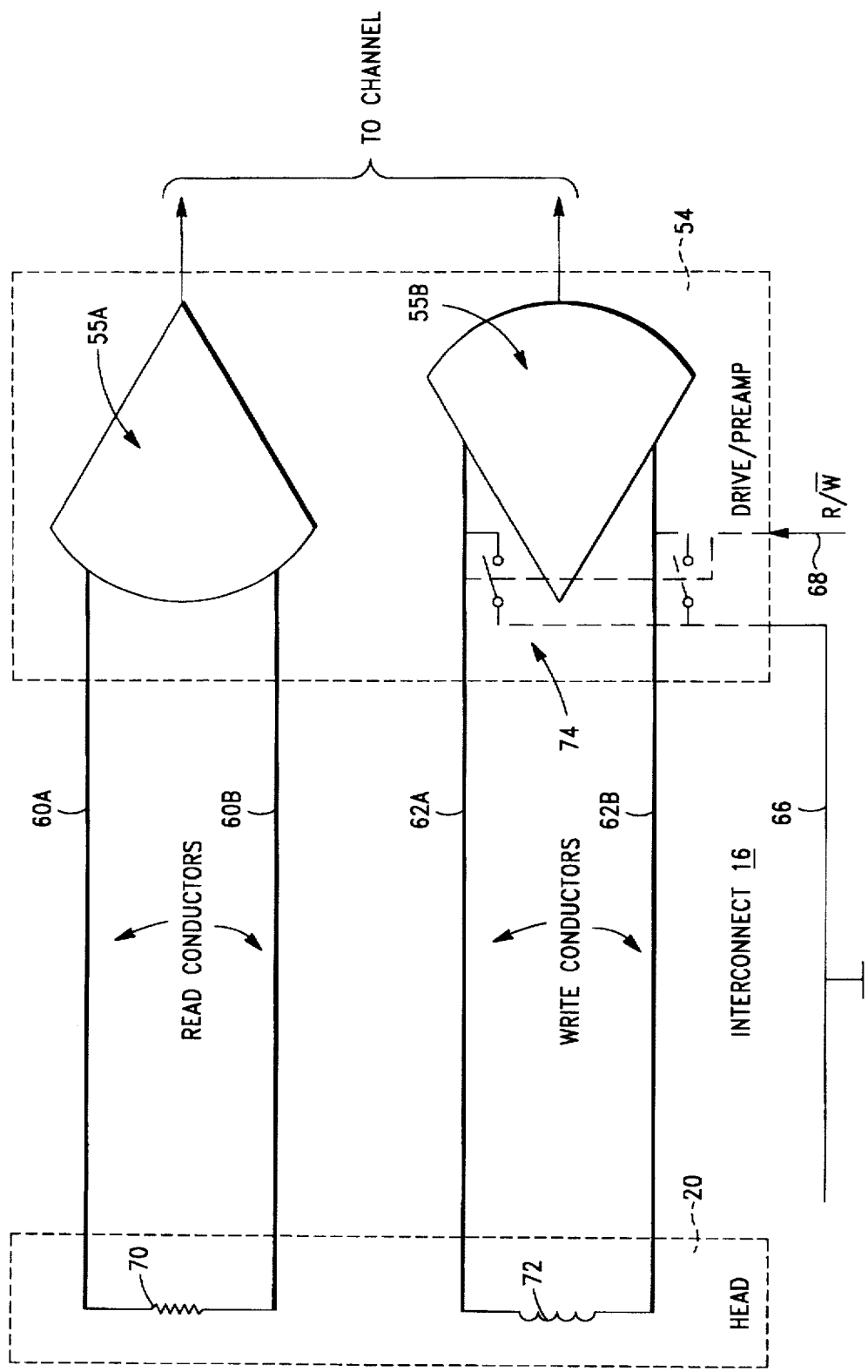
FIG. 6 is an electrical circuit diagram of the trace interconnect structure in accordance with the present invention and includes the head and the preamplifier/driver circuit of the FIG. 1 disk drive.

In the FIGS. 5 and 6 trace interconnect array 16B the ground plane is provided by the thin steel flexure 14. The trace interconnect array 16B is formed on the insulating layer 25 and includes six write loop traces wherein traces 62A1, 62A2 and 62A3 are connected in parallel to form the conductive path 62A, and wherein traces 62B1, 62B2 and 62B3 are connected in parallel to form the conductive path 62B. Traces 62B1 and 62A1 are located in an innermost (or lowest as viewed in FIG. 6) layer, adjacent to the dielectric layer 25 and flexure 14. Traces 62A3 and 62B2 are longitudinally and laterally aligned with traces 62B1, and 62A1, respectively. Thus, trace 62A3 is directly over trace 62B1, and trace 62B2 is directly over trace 62A1. This arrangement effectively results in balanced capacitance of both write paths 62A and 62B to ground. Other write pair trace components 62A2 and 62B3 enclose the read loop 60A–60B at the middle trace layer. From inspection of FIG. 5, the write pair components 62A1, 62B1 of the innermost layer adjacent dielectric layer 25, and the components 62A3 and 62B2 at the outermost or uppermost layer, have width dimensions approximately twice the width dimensions of the read pair 60A–60B. Trace widths may be tuned in order to achieve desired electrical impedance characteristics, as explained in greater detail in the commonly assigned, copending patent applications referred to above.

As with the trace interconnect array 16 of FIG. 3, the trace interconnect arrays 16A and 16B of FIGS. 4 and 5, respectively, require that the read preamplifier/write driver chip 54 effectively ground the write trace path 62A–62B during data reading operations, in order for the write traces to function as electrostatic shielding to protect the read path traces. A grounding arrangement is shown in FIG. 6. In FIG. 6, the read trace conductors 60A–60B extend from the MR read element 70 to a preamplifier 55a of the preamp/driver chip 54, and the write trace conductors 62A–62B extend from a driver 55b of the chip 54 to the inductive write element 72. A switching structure 74 within the chip 54 effectively grounds the write conductors 62A and 62B during reading operations when the head 70 is actively picking up low level magnetic flux transitions recorded on the storage disk 36. A ground plane 66 is diagrammed in FIG. 6 and includes the flexure 14.

The trace interconnect array 16 is conventionally formed by any suitable patterning technique, whether by way of photolithography and selective etch, or by selective deposition, lamination or attachment of the conductive traces to the dielectric layers with adhesives, etc. A protective overcoat of dielectric film material may be provided over the outermost trace layer of the trace interconnect arrays 16, 16A, and 16B to prevent any corrosion or oxidation of the traces, and/or to provide desired mechanical properties to the structure.

Although the present invention has been described in terms of the presently preferred embodiment, i.e., a deposited conductor flexure structure which implements a gimbal, it should be clear to those skilled in the art that the present invention may also be utilized in conjunction with, for example, an integrated gimbal load beam structure, or other conductive suspension members having proximately mounted, deposited, or embedded conductors with or without insulating overcoatings. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A self-shielding integrated flexure/conductor structure for supporting a multi-element read/write head/slider structure adjacent to a data storage disk and for electrically interconnecting a read element of the head to read circuitry, and for electrically interconnecting a write element of the head to write circuitry, the flexure/conductor structure comprising:

a generally planar conductive flexure member having a gimbal for supporting the read/write head/slider structure in proximity to a relatively moving data storage disk;

a first electrical insulation layer disposed on the flexure member;

electrical traces forming a write path connecting the write element with the write circuitry disposed on the first electrical insulation layer, electrical traces forming a read path connecting the read element with the read circuitry, and trace shield means included within the integrated flexure/conductor structure for shielding the read path during data reading operations when data is read from the storage medium.

2. The self-shielding integrated flexure/conductor structure set forth in claim 1 wherein the electrical traces forming the read path are formed on the first electrical insulation layer in substantially parallel longitudinal alignment with the traces forming the write path, and wherein the trace shield means comprises electrical traces included in the write path, and further comprising means for effectively grounding write path traces during data reading operations.

3. The self-shielding integrated flexure/conductor structure set forth in claim 2 wherein the electrical traces forming the read path are arranged on the insulation layer between the electrical traces forming the write path.

4. The self-shielding integrated flexure/conductor structure set forth in claim 1 further comprising a second electrical insulation layer formed over the first electrical insulation layer and a second layer of electrical traces comprising the write path and the read path, wherein the read path traces are positioned between the write path traces.

5. The self-shielding integrated flexure/conductor structure set forth in claim 4 further comprising a third electrical insulation layer formed over the second electrical insulation layer and a third layer of electrical traces comprising the write path are formed on the third insulation layer.

6. A disk drive for storing and reproducing information, the disk drive comprising:

a disk drive base;

a storage disk rotatably mounted to the base and rotated by disk motor means;

a slider for flying in proximity to a data storage disk;

a dual-element magnetoresistive read/inductive write head for reading information from and writing information to the storage disk;

a movable actuator mounted to the base for selectively positioning the head relative to a radius of the storage disk;

a read preamplifier/write driver circuit mounted on the actuator for communicating with head; and an integrated-conductor suspension attached to the actuator for supporting the head adjacent to the storage disk and for electrically interconnecting the head to the signal processing means, the suspension comprising:

a generally planar conductive load beam structure having a proximal actuator mounting end and a gimbaled head mounting region at a distal end for attaching the head, an electrical insulation layer attached to the load beam structure along a trace interconnect region, and at least four electrically conductive traces disposed on the electrical insulation layer adjacent to the load beam such that two of the electrically conductive traces connect a write element of the dual-element head to the circuit and provide an electrostatic ground shield to two other traces connecting a read element of the dual-element head to the circuit during read operations of the disk drive.

7. The disk drive set forth in claim 6 wherein the read preamplifier/write driver circuit is mounted to a side of the moveable actuator.

8. The disk drive set forth in claim 6 wherein the read preamplifier/write driver circuit includes a switching structure for coupling the conductive traces connected to the write element to ground during read operations of the disk drive.

9. The disk drive set forth in claim 6 wherein:

the load beam structure includes a generally planar conductive flexure member having a gimbal for supporting the head in proximity to a relatively moving data storage disk;

the first electrical insulation layer is disposed on the flexure member; and the electrical traces are disposed on the first electrical insulation layer.

10. The disk drive set forth in claim 9 wherein the electrical traces connected to the read element are formed on the first electrical insulation layer in substantially parallel longitudinal alignment with the traces connected to the write element.

11. The disk drive set forth in claim 10 wherein the electrical traces connecting the read path are arranged on the insulation layer between the electrical traces connected to the write element.

12. The disk drive set forth in claim 9, further comprising a second electrical insulation layer formed over the first electrical insulation layer and a second layer of electrical traces disposed on the second electrical insulation layer, the second layer of electrical traces comprising a write path connecting the write element to the circuit and a read path connecting the read element to the circuit the read path traces being positioned between the write path traces.

13. The disk drive set forth in claim 12, further comprising a third electrical insulation layer formed over the second electrical insulation layer and a third layer of electrical traces disposed on the third electrical insulation layer, the third layer of electrical traces connecting the write element to the circuit.

* * * * *